May 21, 1940.    D. W. WALTERS    2,201,567
CLUTCH
Filed Nov. 2, 1937    2 Sheets-Sheet 1

Inventor
Daniel W. Walters
By Lyon & Lyon
Attorneys

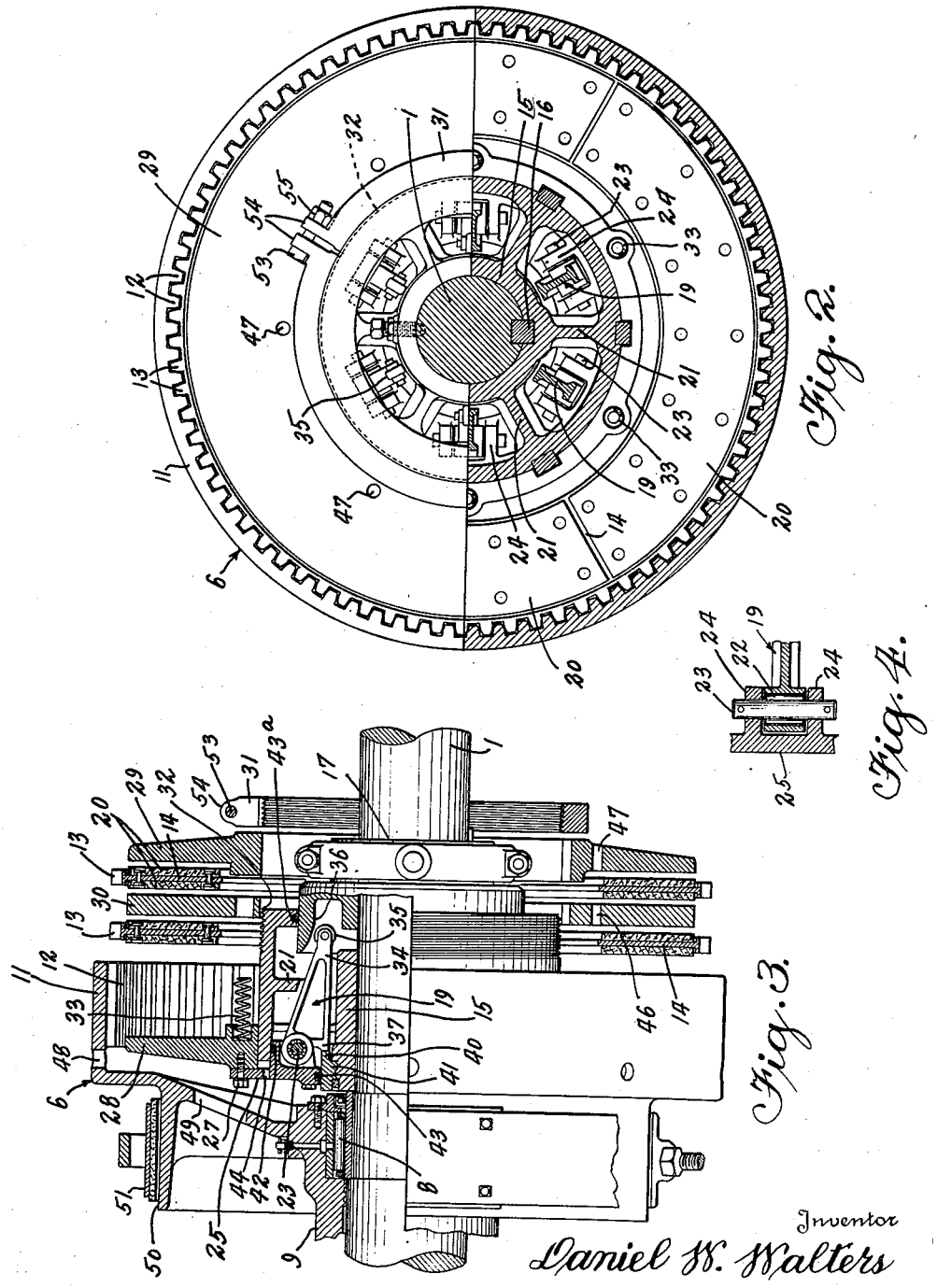

Patented May 21, 1940

2,201,567

UNITED STATES PATENT OFFICE 2,201,567

CLUTCH

Daniel W. Walters, West Los Angeles, Calif., assignor to The National Supply Company, Torrance, Calif., a corporation of Pennsylvania Application November 2, 1937, Serial No. 172,387

10 Claims. (Cl. 192—69)

This invention relates to clutches of the friction type, and more particularly to an assembly of a clutch of the friction type wherein provision is made for ready accessibility to the lining of the driven plates of such clutch to enable the removal and replacement of the lining.

In friction clutches of the conventional type it is necessary, because of the structural relationship of the parts of such clutch, to remove the clutch actuating structure before it is possible to remove the driven plates of such clutch for the purpose of relining or replacing the friction elements thereof.

It is, therefore, an object of my invention to provide a friction clutch wherein the friction elements of such clutch are positioned at a place of ready accessibility with relation to the clutch actuating members so that the friction elements, or driven plates, of the clutch may be readily removed to effect replacement of the lining on repair or replacement of the plates as required.

Another object of my invention is to provide a friction clutch in which the friction actuating elements are positioned and housed within the clutch structure and are connected with the clutch structure in such a manner as to permit such actuating elements to be permanently positioned so as not to require their removal for the repair or replacement of the friction elements of the clutch.

Another object of my invention is to provide a friction clutch wherein the actuating elements for actuating the clutch elements are mounted within a sealed housing for the retention of lubricant for the actuating levers and their supporting bearings, and wherein said housing provides an enclosure for preventing the admission of foreign matter such as particles worn from friction elements of the clutch structure from entering into and fouling the operating parts of the clutch.

Another object of my invention is to provide a clutch of the friction type wherein the clutch actuating mechanism is capable of complete assembly and adjustment apart from the clutch structure before it is introduced into the enclosed housing.

Another object of my invention is to provide a clutch of the friction type wherein means is provided for the dissipation of heat generated within the clutch structure.

Another object of my invention is to provide a friction clutch entirely devoid upon its periphery of obstructions and wherein the actuating levers for such structure are of the centrifugally actuated type completely enclosed within the clutch structure, and generally within the interior of the drive and driven elements of the clutch structure.

Another object of my invention is to provide the reverse gear clutch assembly particularly applicable for use in the providing of a power means for actuating a well drilling mechanism including a clutch of the friction type operatively associated with a reverse gear wherein to provide a reversible drive for such drilling equipment.

Other objects and advantages of this invention it is believed will be apparent from the following detailed description of a preferred embodiment thereof as illustrated in the accompanying drawings.

In the drawings:

Figure 2 is an end elevation partly in section taken substantially on the line 2—2 of Figure 1.

Figure 3 is an elevation partly in vertical mid-section of the clutch mechanism embodying my invention illustrating the removal of the friction assembly from the clutch without disturbance of the clutch actuating mechanism.

Figure 4 is a sectional view taken substantially on the line 4—4 of Figure 1.

Figure 1:
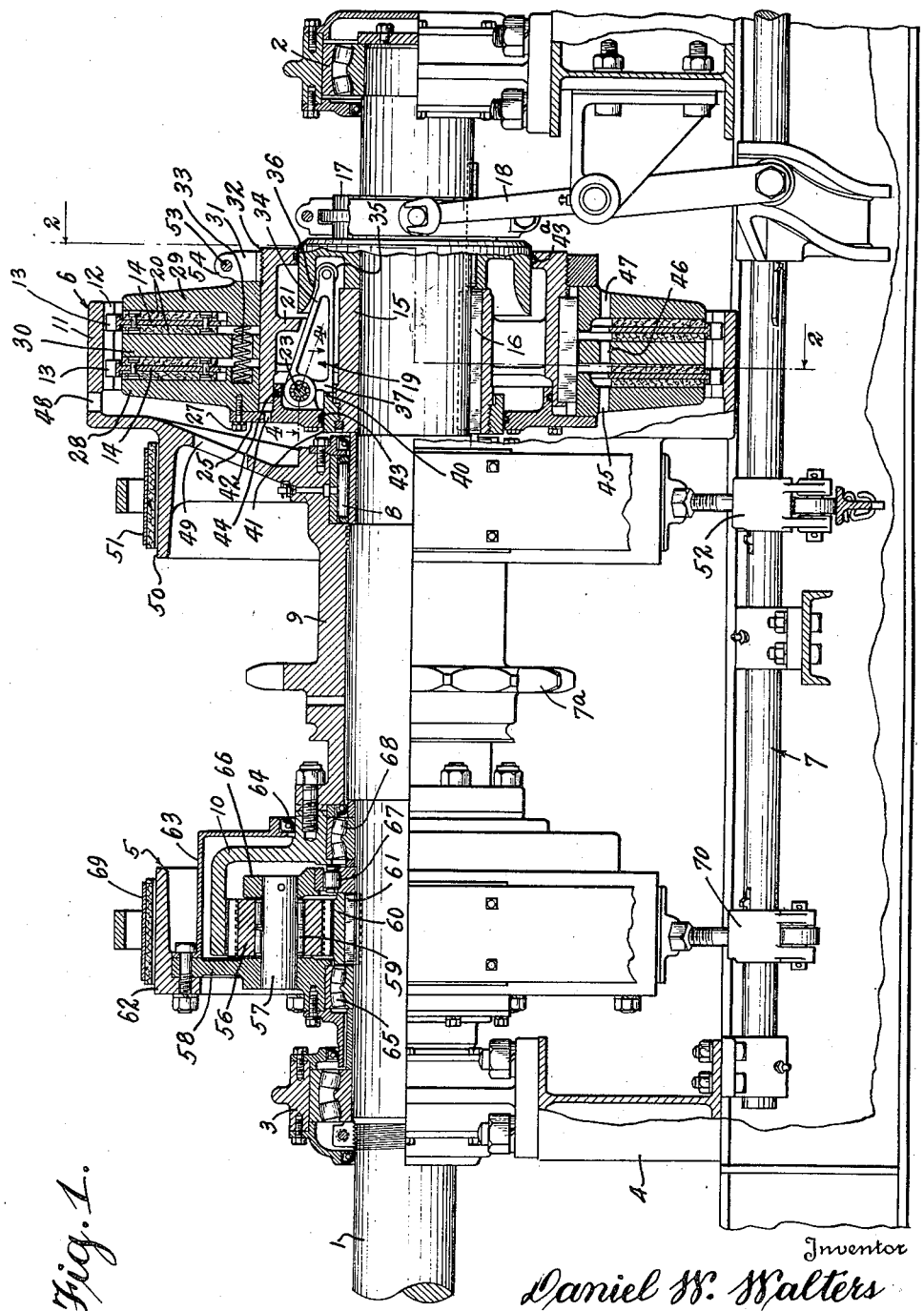
Figure 1 is an elevation partly in vertical mid-section of a reverse gear and clutch assembly embodying my invention wherein the friction clutch of my invention is illustrated as in engaged position.

In the preferred embodiment of my invention as illustrated in the accompanying drawings, 1 indicates a shaft supported on bearings 2 and 3 upon a suitable form of frame structure 4. Mounted upon the shaft 1 is a reverse gear 5, clutch 6, and a suitable actuating assembly 7 for actuating the reverse gear 5 and clutch 6. Power is adapted to be applied to rotate the shaft 1 by any suitable or desirable means as is well understood in the art, and the reverse gear mechanism 5 and clutch 6 is provided for transmitting this power to the driven sprocket 7ª over which a chain is trained for driving the elements of a rotary drilling outfit in a manner likewise well understood in the art. The assembly of the reverse gear clutch provides a releasable form of transmission whereby the sprocket 7ª may be releasably driven either in a forward or rearward direction of rotation.

Mounted upon the shaft 1 upon a bearing 8 is a driven element 9 of the clutch 6, which driven element 9 as herein illustrated may be likewise formed integral with the sprocket 7ª and as an integral assembly with the integral gear 10 for the reverse gear 5.

While the clutch as herein illustrated has been particularly applied and applicable to such a reverse gear drive assembly, it will be obvious that the principles of my invention as set forth in respect to such clutch mechanism are applicable for friction clutches of general use and applicability, and my invention in the clutch structure does not in any way limit it to its applicability to the reverse gear drive mechanism as herein illustrated. The driven element 9 of the clutch is formed to provide an exterior clutch drum 11 upon the inner periphery of which there is formed clutch teeth 12. The clutch teeth 12 provide means for forming a positive connection in rotation with the teeth 13 formed upon the outer periphery of the driven clutch rings 14. This form of connection permits of relative sliding engagement in an axial direction of the clutch rings 14 with the drum 11.

Mounted upon the shaft 1 is the driving member 15 of the clutch. The driving element is suitably affixed to the shaft 1 by any suitable or desirable means such, for example, as by means of a key 16.

Splined on the shaft 1 in order to slide longitudinally therealong is the clutch actuating collar 17 which is connected with the clutch actuating yoke 18 of the actuating mechanism 7. The driving element 15 is formed as a reinforced cylinder which provides a housing for the clutch actuating levers 19 which are mounted within the housing cylinder thus formed immediately within the driven plates 14 of the clutch assembly thus forming a compact structure as well as completely protecting the clutch actuating members 19 and their actuating and supporting parts from foreign matter such, for example, as parts worn or broken from the linings 20 of the driven plates 14. The driving member 15 is reinforced by radial reinforcing ribs 21 which are broken at spaced intervals in order to provide for the reception of the clutch actuating members 19. The clutch actuating members 19 are supported by bearings 22 upon pins 23. The pins 23 are secured in position between supporting ears 24 carried by the closure plate 25. The closure plate 25 likewise forms the movable clamping plate for the friction clutch assembly. The closure plate 25 is secured by cap screws 27 to the inner movable driving clutch plate 28.

Positioned between the driven clutch plates 14 is an intermediate clamping plate 30. The outer clamping plate 29 of the clutch assembly is slidably mounted upon the outer periphery of the cylindrical driving member 15 and is held in position by means of a split clamp ring 31 which is threaded as indicated at 32 to the periphery of the cylindrical member 15. Interposed between the movable driving clutch plate 28 and the clutch plate 29 are expansion springs 33 which normally urge the clutch plates into released or separated position.

The clutch actuating members 19 include long arms 34 at the outer end of which are carried actuating rollers 35 which are engaged along the bell-shaped cam face 36 of the clutch actuating collar 17. The short arms 37 of the clutch actuating member 19 engage the shoulder 40 of the removable abutment collar 41. The removable abutment collar 41 is threaded to the driving member 15 and under normal operation is fixed in position to provide the fixed shoulder 40 against which the short arm of the clutch actuating member 19 engages. The threaded engagement between the collar 41 and the driving member 15 provides the means for adjustment of the throw for determining the amount of movement of the clutch plate 28 toward the clutch plate 29 when actuated to engage the driven clutch plates 14.

The clutch actuating members 19 are of the centrifugal actuating type and the operation of the clutch embodying my invention is that with the clutch actuating collar 17 moved toward the left as viewed in Figure 1, the long arm 34 is forced downwardly by the roller 35 riding along the cam surface 36 of the clutch collar 17. The short arm 37 engages the fixed shoulder 40, thereby causing the pins 23 and the closure plate 25 to be moved toward the right, resulting in movable plate 28 being forced toward the fixed plate 29 to clamp the driven plates 14 between the plates 28, 30 and 29.

Upon movement of the clutch collar 17 toward the right, the cam surface 36 is moved away from the roller 35, permitting the roller 35 to swing outward under the influence of centrifugal force to thereby move the clamping plate 28 toward the left and away from the plate 29 under the influence of the springs 33.

In order to provide a sealed and enclosed structure within the housing provided by the driving element 15, the closure plate 25 is provided by packing rings 42 and 43 engaging the inner periphery of the cylindrical driving member 15 and outer periphery of the collar 41, respectively, and the cylindrical member 15 is provided at 43ᵃ with packing to provide a seal against the periphery of the clutch collar 17. Thus a closed chamber is formed within the cylindrical driving member 15 for the retention of lubricant therein in which the actuating members 19 are positioned and thereby providing lubricant for the cam rollers 35 and the bearings 22 upon which the actuating members are mounted. This enclosed assembly likewise prevents the admission of foreign matter to the operating parts of the clutch.

As will be evident from Figure 3, the driven clutch plates 14 may be removed from the assembly without disturbing the actuating members 19 or their settings by merely unthreading the clamping ring 31 from the exterior periphery of the cylindrical driving member 15 and then sliding the clutch plates 29, 14, 30 and 14 outwardly along the shaft 1, whereby the lining 20 may be replaced as desired.

An opening 44 is formed in the closure plate 25 to provide a vent for the annular space between the closure plate 25 and the outer wall of the member 15.

In order to provide for the dissipation of heat generated into the clutch structure outwardly into the air, there is provided a plurality of apertures 45, 46 and 47 in the clamping plates 28, 30 and 29, respectively. These apertures permit circulating air to carry away the heat generated by the clutch elements through the draft created during the rotation of the clutch structure, which draft is induced between the apertures 48, 49 formed in the driven member 9 of the clutch assembly.

Formed upon the driven member 9 is a neutral brake rim 50 upon which is mounted a brake band 51 which is operatively connected by means illustrated at 52 for causing engagement of the band 51 with the rim 50 to hold the driven mechanism from rotation when desired.

In order to lock the clamping ring 31 to the exterior of the cylindrical driving member 15, a clamping bolt 53 is passed through ears 54 formed on the split clamp ring 31. Bolt 53 is held in clamping position by means of the nut 55.

The internal gear of the reverse drive 5 meshes with planet gears 56. The planet gears 56 are supported on stub shafts 57 which stub shafts 57 are carried by the spider 58. The planet gears are mounted upon the stub shafts on roller bearings 59. The planet gears 56 mesh with the sun gear 60. The sun gear 60 is suitably fixed to the shaft 1 as by means of keys 61. The spider 58 supports the brake rim 62 and also a closure plate 63. The closure plate 63 is sealed to the driven element by a sealing ring 64 so that the gear structure is completely housed and enclosed. The spider 58 is journaled on bearings 65 upon the shaft 1. The stub shafts 57 are likewise carried by, and supported at their ends within, a supporting plate 66 which is journaled upon bearings 67 upon the shaft 1. The end of the driven member 9 which carries the internal gear 10 is rotatably supported upon the shaft 1 by means of the bearings 68. A brake band 69 is mounted upon the brake rim 62 and is adapted to be actuated by an actuating means 70 of the actuating assembly 7.

In reversing the drive, the clutch is disengaged by moving the clutch engaging collar 17 toward the right. The brake band 69 is then tightened against the brake rim 62 holding the spider 58 stationary whereby the planet gears 56 rotate about their bearings 59 on the stub shaft 60. This establishes a reverse drive to the driven member 9 and sprocket 7ª through the gearing 60, 57 and 10, causing the sprocket 7ª to rotate in a direction opposite to the direction of rotation of the shaft 1.

Having fully described my invention, it is to be understood that I do not wish to be limited to the details herein set forth, but my invention is of the full scope of the appended claims.

I claim:

1. In a clutch, the combination of a driving member and a driven member, rotatable about a common axis, a housing formed on said driving member, normally disengaged friction elements encircling said housing and adapted to form a driving connection between said driving and driven members when moved axially into engagement on said housing, an axially movable member connected to one side of said friction elements, a ring adjustable on said housing providing a relatively stationary abutment on the opposite side of said friction elements, a plurality of levers, each having a long and a short arm pivoted to the axially movable member and encased by said housing, an abutment on the driving member engageable by the short arm upon means actuating the long arm radially, whereby movement is imparted to the movable member axially toward the stationary abutment for clamping the friction elements together.

2. In a clutch, cooperating driving and driven members, rotatable about a common axis, a housing formed on one of said members, friction elements having driving connection with and interposed between said driving and driven members and encircling said housing, a plurality of clutch levers, said levers being located within said housing, means to actuate the clutch levers to clamp said friction elements together, whereby rotary motion is imparted one member to the other, an adjusting ring forming an abutment for the friction elements in the driving and released position of the elements, releasable locking means for said adjusting ring, whereby upon releasing the lock and removing the adjusting ring, the friction elements may be removed from the housing independent of the clutch levers.

3. In a clutch, the combination of a driving member and a driven member mounted for rotation about a common axis, one of the members encircling the other and defining between them an annular recess, a plurality of annular friction drive elements disposed within said annular recess and adapted to form a driving connection between said driving and driven members when clamped together, a removable abutment secured upon one of said members at one side of said annular friction elements, a clamping member slidably mounted for axial movement and positioned at the other side of said annular friction elements, actuating mechanism for said clamping member including a plurality of pivotally mounted bell cranks thereon each provided with a long arm and a short arm, each bell crank being mounted so that movement of the long arm toward said axis of rotation causes the short arm to move the clamping member toward clamping position, the said actuating mechanism being positioned radially inwardly of said annular recess, and common means adapted to actuate the long arms of said bell cranks.

4. In a clutch, the combination of a driving member and a driven member mounted for rotation about a common axis, one of the members encircling the other and defining between them an annular recess, a plurality of annular friction drive elements disposed within said annular recess and adapted to form a driving connection between said driving and driven members when clamped together, a removable abutment secured upon one of said members at one side of said annular friction elements, a clamping member slidably mounted for axial movement and positioned at the other side of said annular friction elements, actuating mechanism for said clamping member including a plurality of pivotally mounted bell cranks each provided with a long arm and a short arm, each bell crank being mounted so that movement of the long arm toward said axis of rotation causes the short arm to move the clamping member toward clamping position, the said actuating mechanism being positioned radially inwardly of said annular recess, whereby upon removal of said abutment, the friction elements may be removed from said annular recess independently of said actuating mechanism, and common means adapted to actuate the long arms of said bell cranks.

5. In a clutch, the combination of a driving member and a driven member mounted for rotation about a common axis, one of the members encircling the other and defining between them an annular recess, the inner boundary of said annular recess being formed by a substantially cylindrical wall on the inner member, a plurality of annular friction drive elements disposed within said recess and adapted to form a driving connection between said driving and driven members when clamped together, an abutment secured upon one of said members at one side of said annular friction elements, a clamping member slidably mounted for axial movement and positioned at the other side of said annular friction elements, actuating mechanism including a plurality of clutch levers adapted to move said clamping member toward said abutment, said actuating mechanism being enclosed within a housing formed within said cylindrical wall on the inner member, the housing being adapted to exclude foreign matter and to confine lubricant for said actuating mechanism, and common means adapted to actuate said clutch levers.

6. In a clutch the combination of an inner member and an outer member rotatable about a common axis, a housing formed on the inner member, a friction drive element encircling said housing and having a positive driving engagement with the other member, an abutment removably secured relative to said housing at one side of said friction drive element, a movable clamping member slidably mounted at the other side of said friction drive element, actuating mechanism including a plurality of clutch levers adapted to clamp said friction drive element between said movable member and said abutment whereby rotary motion is imparted from one member to the other, the clutch levers being enclosed within said housing radially inwardly of said friction drive element, whereby upon removal of said abutment, the friction drive element may be removed axially from said members independently of said clutch levers.

7. In a clutch, the combination of cooperating driving and driven members rotatable about a common axis, a housing formed on the first of said members, an annular friction element encircling said housing and having a driving connection with the other of said members, clamping means carried on the first of said members adapted to clamp the friction element therebetween to establish a frictional driving engagement between the said members, actuating mechanism including a plurality of pivoted levers enclosed within said housing adapted to actuate said clamping means, and common means adapted to actuate said pivoted levers.

8. In a clutch, the combination of a driving member and a driven member mounted for rotation about a common axis, one of the members encircling the other and defining between them an annular recess, an annular friction element disposed within said annular recess and having a driving connection with one of said members, an abutment secured upon the other of said members at one side of the annular friction element, a clamping member slidably mounted for axial movement and positioned at the other side of said annular friction element, actuating mechanism for said clamping member including a plurality of pivotally mounted bell cranks thereon each provided with a long arm and a short arm, each bell crank being mounted so that movement of the long arm causes the short arm to move the clamping member toward the abutment to clamp the friction element therebetween, the said actuating mechanism being positoned radially inwardly of said annular recess, and common means adapted to actuate the long arms of said bell cranks.

9. In a clutch, the combination of a driving member and a driven member mounted for rotation about a common axis, one of the members encircling the other and defining between them an annular recess, an annular friction element disposed within said annular recess and having a driving connection with the outer member, an abutment removably secured upon the inner member at one side of the friction element, a clamping member slidably mounted for axial movement and positioned at the other side of said friction element, actuating mechanism for said clamping member including a plurality of pivotally mounted bell cranks each provided with a long arm and a short arm, each bell crank being mounted so that movement of the long arm causes the short arm to move the clamping member toward the abutment to clamp the friction element therebetween, the said actuating mechanism being positioned radially inwardly of said annular recess, whereby upon removal of said abutment, the friction element may be removed from said annular recess independently of said actuating mechanism, and common means adapted to actuate the long arms of said bell cranks.

10. In a clutch, the combination of an inner member and an outer member rotatable about a common axis, a housing formed on the inner member, an annular friction element encircling said housing and having a positive driving engagement with the outer member, clamping means carried on the inner member adapted to clamp the friction element therebetween to establish a frictional driving engagement between said members, actuating mechanism, enclosed within said housing and adapted to actuate said clamping means, the housing being adapted to exclude foreign matter and to confine lubricant for said actuating mechanism, and means shiftable along said axis to control the operation of said actuating mechanism.

DANIEL W. WALTERS.